United States Patent
Feik

(10) Patent No.: US 6,850,913 B2
(45) Date of Patent: Feb. 1, 2005

(54) METHOD FOR ADMINISTERING CERTIFICATION DATA

(75) Inventor: Ulrich Feik, Köln (DE)

(73) Assignee: TÜV Rheinland Holding AG, Köln (DE)

(*) Notice: Subject to any disclaimer, the term of this patent is extended or adjusted under 35 U.S.C. 154(b) by 651 days.

(21) Appl. No.: 09/941,549

(22) Filed: Aug. 30, 2001

(65) Prior Publication Data

US 2002/0112034 A1 Aug. 15, 2002

Related U.S. Application Data

(63) Continuation-in-part of application No. PCT/EP01/01532, filed on Feb. 11, 2001.

(51) Int. Cl.[7] .............................................. G06F 17/60
(52) U.S. Cl. ............................. 705/51; 705/58; 707/3; 707/9
(58) Field of Search ............................. 705/51–59, 405; 707/1–6, 9–10, 100–104; 380/201–202; 713/165, 156; 382/180

(56) References Cited

U.S. PATENT DOCUMENTS 5,974,141 A * 10/1999 Saito ........................... 705/52
6,366,899 B1 * 4/2002 Kernz ........................... 707/1
6,484,162 B1 * 11/2002 Edlund et al. ................. 707/3
6,629,092 B1 * 9/2003 Berke ........................... 707/3
6,658,394 B1 * 12/2003 Khaishgi et al. ............. 705/58

FOREIGN PATENT DOCUMENTS

JP        01226081 A * 9/1989   ........... G06F/15/62

OTHER PUBLICATIONS

Schlumberger Intros Cryptoflex Security Kit, Oct. 26, 1998, Newsbytes.*

* cited by examiner

*Primary Examiner*—James P. Trammell
*Assistant Examiner*—Mary Cheung
(74) *Attorney, Agent, or Firm*—Venable LLP; Catherine M. Voorhees

(57) ABSTRACT

The invention permits requests for certification information for a certification that has been performed for a product, a service, a system, an organizational process, etc. For this purpose, an Internet address and an identification number appear in a check region of a certification symbol issued by the testing institute. With the identification number, a data record associated with the certification can be accessed from a database that is accessible via the Internet.

35 Claims, 5 Drawing Sheets

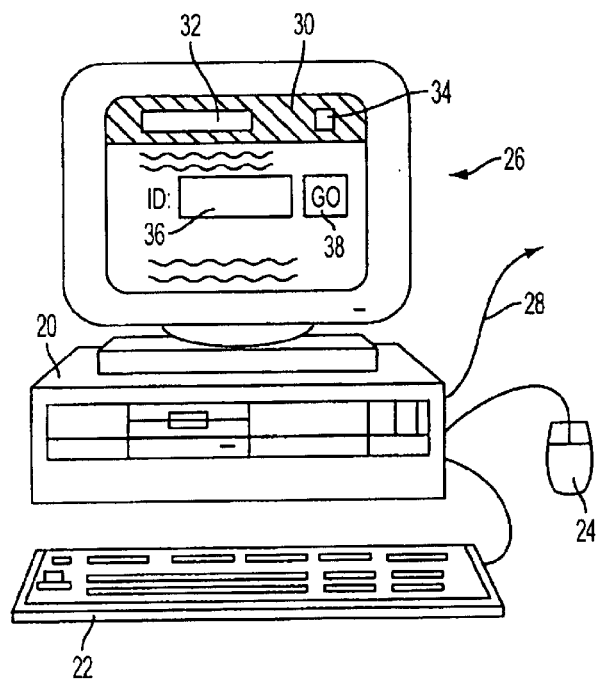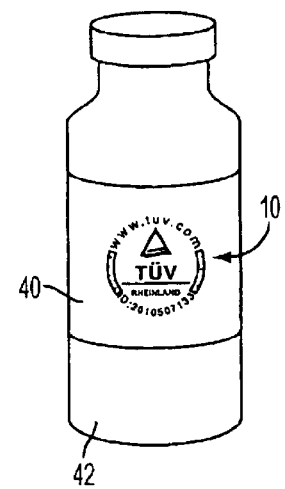
FIG. 2A  FIG. 2B
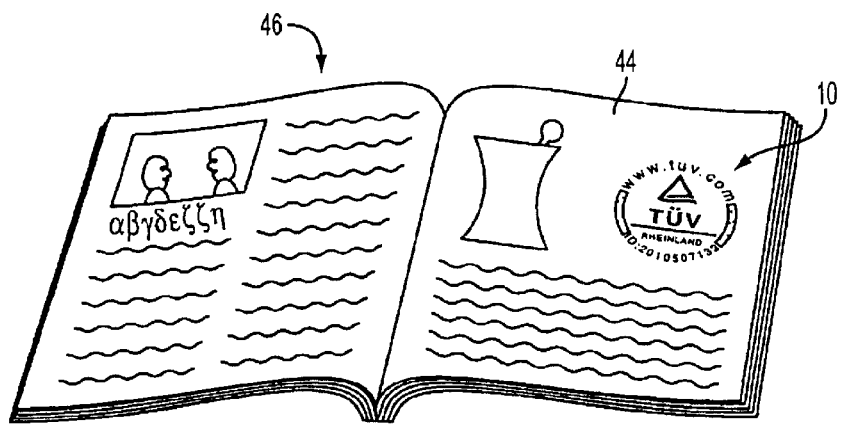
FIG. 2C

METHOD FOR ADMINISTERING CERTIFICATION DATA

CROSS REFERENCE TO RELATED APPLICATION

This application is a continuation-in-part of International Patent Application number PCT/EP01/01532, filed on Feb. 11, 2001 and designating the United States, which International Patent Application is incorporated herein by reference.

BACKGROUND OF THE INVENTION

The invention relates to a method for requesting certification information, as well as to a system for supplying certification information, with the use of a check region of a certification symbol that has been allocated to a resource such as product, a system, a service, or an organizational process.

Numerous technical testing institutes and monitoring authorities the world over perform standardized quality and safety checks of products. The subject of such testing can also include environmental compatibility, durability, and the product's resistance to environmental influences and chemicals, etc. The best-known testing organization in Germany is the TÜV (Technischer ÜberwachungsVerein [Association of Technical Monitoring]), which serves as a certifying organization and performs a wide variety of certifications, in addition to its activities in the area of motor-vehicle registration.

When a positive test result is achieved for a certain product, the authorized technical monitoring or certifying organization issues a corresponding certification symbol, thereby certifying that the characteristics of the product satisfy specific minimum requirements. Known certification symbols include the TÜV badge, which is required for motor-vehicle registration in Germany, the VDE certification symbol for electronic devices, the certification symbol GS ("Geprüfte Sicherheit [Safety-Tested]), etc. Often, the award of a certification symbol certifies that a certain product meets an industry standard established by a standardizing authority. Known industry standards include DIN (Deutsches Industrie Norm [German Industry Standard]) and the ISO standards of the International Standards Organization in the United States.

Systems, such as management systems or product-process systems, are also certified, in addition to certifications for product quality and product safety (PSQ, Product Safety Quality). The standards ISO 9000 and ISO 9001 are particularly well-known in the area of quality management (TQM, Total Quality Management). These standards outline certain quality-assuring operating processes. In the area of air and space travel, processes for assuring flight safety are specified in the standard AS 9000. The standard HACCP, which includes guidelines for producing, storing, and transporting food items, relates to a completely different field.

In summary, certification symbols are not only allocated to products, but also to systems, services, and production and organizational processes. Due to the large number of domestic and foreign certification symbols, the end user may be unable to gauge the significance of a certification symbol appearing on an item. Retailers, buyers, and store managers also cannot readily remain apprised of the significance of the individual certification symbols used in the goods and services industries.

Some manufacturers and suppliers embellish their goods with decorative test seals, although no authoritative certification has been performed. Often, they use seals that resemble standard certification symbols, and thus mislead consumers.

SUMMARY OF THE INVENTION

It is therefore an object of the invention to improve and simplify the accessibility of certification information.

Another object is to provide a simple procedure for permitting members of the public to access certification information concerning products or other resources on the basis of information provided in a check region that is associated with a certification symbol. The certification symbol and its check region would typically appear on products, packaging, advertising, or other literature, so that the information needed for requesting certification information would normally be readily available to people who are interested in the particular resource in question.

A further object of the invention is to provide a way for special classes of people, such as manufacturers of certified products or merchants seeking products to distribute, to gain enhanced access to a database that stores information that is more comprehensive than that available to members of the general public. This permits, for example, an employee of a manufacturing company to update product information in the database when appropriate.

According to one aspect of the invention, these and other objects, which will become apparent from the ensuing detailed description, can be attained by providing a method for requesting certification using a certification symbol that is allocated or awarded to a product, system, service, process, and so forth, via the Internet, the certification symbol being provided with a check region having a specific identification number, wherein the method is characterized in that: (a) the person seeking certification information enters the identification number via his web browser into an input box or region of a web page provided for this purpose, with the address of the web page being indicated in the check region; (b) the web browser transmits the identification number to a web-server arrangement of the certifying organization via the Internet; (c) the web-server arrangement formulates a database search request based on the identification number, and transmits it to a web database that is coupled to the web-server arrangement; (d) the certification information associated with the identification number is read out of the web database; and (e) the certifying organization's web-server arrangement transmits the certification information via the Internet to the web browser of the person who requested the information.

BRIEF DESCRIPTION OF THE DRAWINGS

The invention is described in detail below by way of an exemplary embodiment illustrated in the drawings, in which:

FIG. 2A schematically illustrates a personal computer with a monitor which is shown illustrating an example of a web page of a certifying organization, the web page having a box or region for receiving an identification number;

FIG. 2B is a front view illustrating a bottle with a label bearing a certification symbol;

FIG. 2C is a perspective view of a magazine with an advertisement that includes a certification symbol;

DESCRIPTION OF THE PREFERRED EMBODIMENTS

Figure 1A:
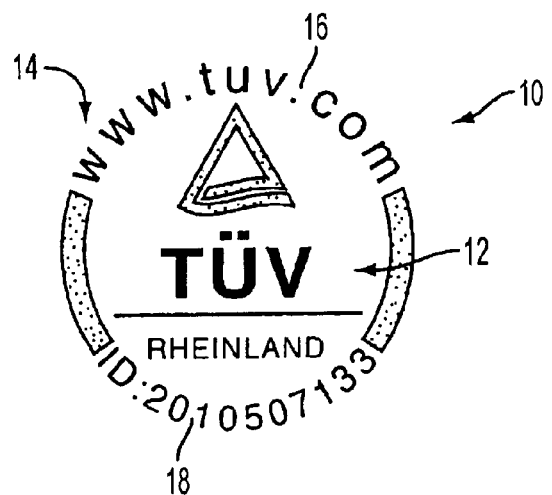
FIG. 1A shows an example of a certification symbol in accordance with the invention, which includes the information required for accessing a product, system, or service certificate.

The method of the invention permits one to request certification information via the Internet with the aid of a certification symbol that has been allocated to a product, a system, a service, an organizational process, etc. To this end, the certification symbol is assigned a specific identification number that is depicted in a check region added to the certification symbol.

In a first step, a person who wants to use the invention (the "user") in order to request certification information employs his web browser to enter the identification number into an input field of a web page that is provided for the number. The web page address is indicated in the check region.

The user's web browser then transmits the identification number, via the Internet, to a web-server arrangement of the certifying organization. In the next step, the web-server arrangement formulates a database search request based on the identification number, and transmits the request to a web database that is coupled to the web-server arrangement. The certification information relating to the identification number is read out of the web database, then transmitted by the web-server arrangement of the certifying organization via the Internet to the web browser of the requester.

The check region used in the method of the invention is self-explanatory. The combination of "web address+ identification number" can be understood and used worldwide without necessitating additional explanations and instructions. A certification symbol having a check region with a web address and an ID number can be used and understood worldwide without necessitating translations ("world character").

The check region itself has a universal appearance that fosters familiarity and good recognizability of the check region. Until now, the large number of legitimate certification symbols and seals resembling legitimate certification symbols sometimes kept a legitimate certification symbol from influencing the end consumer's purchase decision. The new universal check region added to certification symbols could reinforce consumer acceptance.

With the method according to the invention, a user of any Internet-ready computer can request information about which characteristics of the certified products, system, service, etc., were tested in the certification process, and which testing methods were employed. A user who has a specific product can use an Internet search to obtain more detailed information about a wide variety of characteristics of the product. The specific product and certification information can be downloaded worldwide from any location, twenty-four hours a day, and within a short period of time, making it superior to paper documentation. A further advantage of the method of the invention for downloading certification information is that the user always receives current information (unlike paper documentation).

With the method of the invention, the user can check whether a certificate was actually issued for a certain product, system, etc. (proof of legitimacy), and whether the manufacturer's specifications match the certified test results. Thus, fraudulent certification symbols can be identified more frequently than before.

The identification number appearing in the check region of the certification symbol serves as a key to all of the services offered by the certifying organization, and represents the sum of the performed tests in a compressed form.

The central storage of product and certification data creates an efficient commercial database that can be used as an orientation aid for professional purchasers of all distribution levels. The result is a "virtual market" of comparable products and services that can be tapped with suitable search tools.

A product database can be created gradually and then utilized by official organizations (TGA, ZLG, OSHA, ZVI, etc.). These organizations gain fast and easy access to information that is relevant for prosecuting fraud, product piracy, and unauthorized symbol use.

It is advantageous for the user to transmit the identification number to the web-server arrangement, and for the web-server arrangement to transmit the certification information to the user via the Internet in accordance with the standard HTTP (Hyertext Transfer Protocol). HTTP is the commonly used Internet protocol supported by all browsers. The identification number can therefore be transmitted from an arbitrary browser to the web-server arrangement of the certifying organization.

In accordance with an advantageous embodiment of the invention, the certifying organization's web-server arrangement includes HTTP servers and web application servers. Whereas the HTTP server handles communication with the Internet, the web application server can perform database queries.

It is advantageous for the web pages to be created in accordance with one or more of the standard software languages, HTML(HyperText Markup Language), DHTML (Dynamic HyperText Markup Language), XML (Extensible Markup Language), and JSP (Java Server Pages). DHTML and XML are descriptive languages used to determine the graphic appearance of a web page. XML represents an expansion of the current, conventional language HTML. For defining the functionality of a web page and for interactive communication with the user, the Internet pages can further include Java code. The standard JSP permits the incorporation of the Java code into the commonly-used page-description languages. The use of JSP permits a clear separation between the graphic appearance of the web pages and the functionality of the pages realized in the form of Java code.

In accordance with a further advantageous embodiment of the invention, Java beans serve in the transmission of the database search request and the read-out of the certification information associated with the identification number. The term "Java beans" refers to autonomous microprograms in the Java programming language that can perform a specific task. Java beans can be used with platform overlap. When an additional function is required, it can be incorporated into the existing software with an additional Java bean. In this respect, Java beans permit great flexibility.

The certification symbol (with its check region) advantageously appears on the product or its packaging. It can be printed, stamped, engraved, etc. On articles of clothing, the certification symbol can be printed on tags and labels. The advantage of applying the certification symbol directly onto the item is that any item owner can use the check region to inquire about the product characteristics and the meaning of the certification symbol via the Internet. To do this, the requester of the information needs only the item itself; no other documentation is necessary.

It is also advantageous for the check region to appear with a certification symbol in a catalogue, a document, operating instructions, or advertising materials. Printing the check region in a catalogue in which the item is described allows potential customers to verify the information given in the catalogue. It is also possible for a manufacturer to enclose a document with its product in which the meaning of the check region is explained, and on which the check region is printed. For example, a certification symbol having a check region could be printed onto a warranty card accompanying the item. The certification symbol, in accordance with the invention, can also be understood in a smaller representation, and is therefore suitable for appearing on business papers and advertising materials accompanying products. The check region can, for example, be included in an advertisement that appears in a printed medium with an image of the product. This allows individuals who are interested in purchasing the product to query its characteristics via the Internet.

The certification symbol can be a PSQ (Product Safety Quality) certification symbol. As an alternative, the certification symbol can be a TQM (Total Quality Management) certification symbol. The use of a TQM certification symbol in brochures, advertising materials, and on business papers permits business partners to conduct a quick check of whether the claimed certification was actually performed.

In a further advantageous embodiment of the invention, the provision of a digital watermark assures the authenticity of the certification information presented to the user. Digital watermarks are very difficult to counterfeit. If the certification documents downloaded from the Internet possess the digital watermark of the certifying organization, the user can be assured that he has obtained the authentic test results.

It is advantageous for defined user groups to be able to register. This permits a registered user to be authenticated and then to be granted expanded access rights and/or improved search functionalities, depending on the user's group. The users of the different groups may require completely different additional functions. These additional functions can be performed in the required form following registration.

It is advantageous to define one user group as "end consumers," with the users of the group not being registered. These users typically require no additional functions, and seek fast and easy access to the relevant certification information.

Another group of users can advantageously be defined as "retailers," with these users being provided with product-related search functions. Users of the "retailer" group can therefore perform a detailed comparison between different products of a product group, comparing all of the certification information available for these products.

It is also advantageous to define one group of users as "manufacturers." The users of this group are granted the right to overwrite specific product information in the web database. Therefore, the users of this group can continuously update the information about the technical characteristics and advantages of their products.

After each user has been authenticated, the certification information read out of the web database can be displayed, along with further useful information, in accordance with a personalized data model. The user himself can indicate the product and certification information in which he has an interest (user-related content management). The user can, for example, inquire about new entries in certain product groups on a default basis in order to follow market developments.

An advantageous embodiment of the invention provides that the certification information intended for public access is transferred to the web database from a master database through a data transfer, with the master database storing more comprehensive certification information, some of which is not intended for the public. A registered user can elect which information on his certificate he wishes to make accessible to the public. The information that is not intended for the public is stored in the master database, but not in the web database. The master database cannot be accessed via the Internet.

To assure this, it is advantageous for the master database to be coupled to an administration server that is not accessible via the Internet. It is also advantageous to decouple the web application server from the Internet during the data transfer from the master database to the web database. Otherwise, an Internet access to the master database could occur during the data transfer.

In accordance with an advantageous embodiment of the invention, the administration server is connected to an Intranet. Certification information that is stored in the master database is modified and supplemented, and new certification information is added, via the Intranet. With the Intranet, the changes and updates transmitted from the various local servers can be combined in the central administration server. The use of a private Intranet permits an unmonitored data transfer.

In the event that the certification information contained in the master database is more current than the certification information contained in the web database, the authorized certifying organization can advantageously be notified. It is then the task of the certifying organization to process the new entries and transmit them from the master database into the web database.

In order to keep the web database current, it is advantageous for a time limit to be set for notifying the authorized certifying organization that the certification information in the web database needs to be updated. Otherwise, the web database would include an increasing amount of inaccurate information, and become invalid.

A further advantageous embodiment of the invention provides allocating a session ID to each connection of a user to the server arrangement. If a predetermined access frequency or a predetermined access length is exceeded, the response to requests is slowed or stopped. The purpose of this measure is to prevent a complete read-out from the web database.

In accordance with an advantageous embodiment, the transmission of the identification number from the user to the web-server arrangement, and the transmission of the certification information from the web-server arrangement to the user, may be radio-based corresponding to the standard WAP. This allows a user to access the web databases via a WAP-capable hand-held computer or a WAP-capable Personal Digital Assistant (PDA). If a shopping consumer sees a product bearing a certification symbol with a check region, and has an available WAP-capable hand-held computer, he or she can download the information that the certifying organization offers about this product, and the allocated certification symbol, via a WAP interface furnished by the certifying organization. To do this, the consumer establishes a connection to the certifying organization with his hand-held computer and types in the identification number provided in the check region of the certification symbol. The display of his hand-held computer or his PDA then presents information about the meaning of the certificate, and additional product information. Because it is expected that the hand-held computers of future generations will have displays that are easier to read, and that have more user-friendly input mechanisms, such services will become more significant.

The system according to the invention permits certification information to be supplied via the Internet after a request for the information has been made with the aid of a check region of a certification symbol that is allocated to a product, a system, a service, an organizational process, and so forth, the check region being provided with a field that displays a specific identification number. The system, according to the invention, has a web-server arrangement that stores a web page having an input region or regions for input of the identification number by a user of the system. The address of this web page is indicated in a field of the check region. Based on the entered identification number, the web-server arrangement formulates a database search request, and transmits it to a web database server, which is likewise a component of the system of the invention. Certification information relating to the different identification numbers is stored in the web database. When the web-server arrangement makes a corresponding database-search request, the certification information is transmitted to the web-server arrangement and then to the user.

It is advantageous for the web-server arrangement to have a plurality of clustered servers. Clustering means that one or more parallel servers is (are) provided for each server arrangement. An advantage of this is that a larger number of search requests from the Internet can be responded to simultaneously. A further advantage is that, in the event of a crash or a defect of one of the parallel-connected servers, the parallel-connected servers of the cluster can additionally assume its tasks. At most, a user accessing the certifying organization's web page only becomes aware of the failure of one of the servers in the form of a notable sluggishness in the data-transfer rate.

FIG. 1A illustrates an example of a certification symbol 10 in accordance with the invention, which is allocated or awarded by the respective certifying organization (here, T ÜV Rheinland) after a successful certification. In this example, the certification symbol 10 includes a central seal region 12, in which is displayed a seal comprising word(s) and/or a design employed by the certifying organization to identify itself to the public as the testing institute that performed the certification. An annular check region 14 surrounds the seal region 12. The check region 14 includes an address field 16 for displaying the Internet address of the homepage (here, www.tuv.com) of the certifying organization. According to the invention, this Internet address in the field 16 can be used to access a web page set up by the certifying organization, where more detailed information about the certification can be obtained.

For downloading the appropriate certification information relating to the certification symbol 10, a ten-digit identification number is displayed in an ID field 18 included in the check region 14. A user of the present invention (who will frequently be called simply the "user" in this description) can access the certifying organization's homepage via an arbitrary PC equipped with a modem and an Internet browser, and type the identification number displayed in the ID field 18 into an input box or region that is provided either on the homepage itself or a linked web page. An example is shown in FIG. 2A, which illustrates a PC 20 that is equipped with a keyboard 22, a pointing device, such as a mouse 24, and a monitor 26. The PC 20 has an internal modem (not illustrated) which can be connected via a telephone cable 28 to the public telephone network (and then to the Internet by way of an Internet service provider). In this example, the monitor 26 is shown displaying, in a cross-hatched section 30, an address region or box 32 and a "Go" or activation button 34 that are provided by the web browser installed on the PC 20. The user can receive the homepage of the certifying organization by using the keyboard 22 to insert the Internet address of this homepage in the address box 32, and then use the mouse 24 to "click on" the activation button 34. Below the cross-hatched section, the monitor 26 is shown displaying the homepage of the certifying organization. It includes an input region or box 36 for receiving the identification number depicted in the ID field 18. As soon as the user has confirmed the entry of the identification number (by pressing the "Return" key or clicking on an activation button 38), a web page containing detailed information about the certification that relates to the certification symbol is displayed on monitor 20 to the user.

In the case of products, it is advisable to apply the certification symbol to the item itself or to packaging for the item. For example, FIG. 2B illustrates the certification symbol 10 printed on the label 40 of a bottle 42 containing a certified product. In the case of certified services, though, it is only possible to include the certification symbol in literature such as catalogs, brochures, and advertising materials, as well as on letterhead. An example is shown in FIG. 2C, which illustrates the certification symbol 10 appearing in an advertisement 44 for pharmaceutical services in a magazine 46. Similarly, the certification symbol 10 can be included in literature for certificates issued for management systems or product-process systems.

Figure 1B:
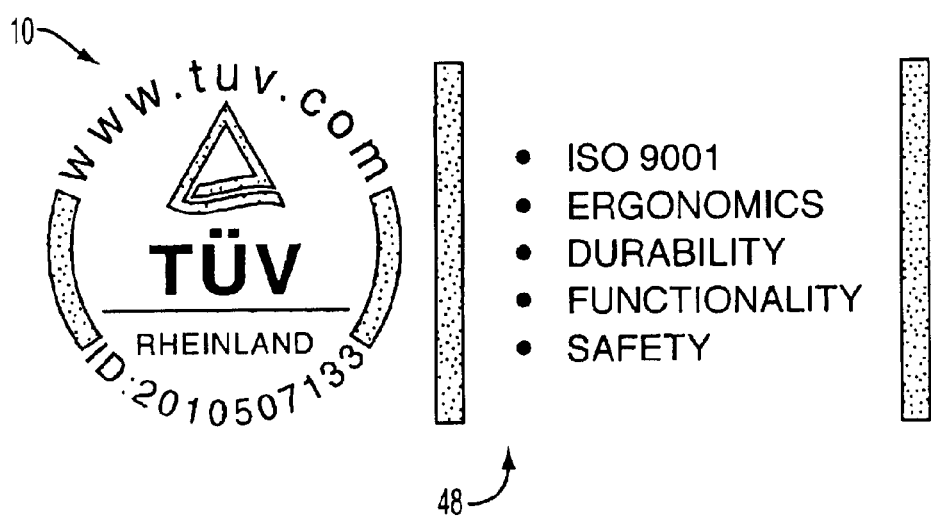
FIG. 1B shows an example of a certification symbol in accordance with the invention, disposed adjacent an auxiliary information block which permits access to certification data of an ISO 9001 certification.

FIG. 1B depicts an example of the certification symbol 10 that is depicted adjacent an auxiliary information block 48, with which a company indicates a successful TQM (Total Quality Management) certification in accordance with DIN ISO 9001.

The identification number appearing in the ID field 18 of certification symbol 10 is used for obtaining the certification information relating to the certification symbol out of the web database. Therefore, a new identification number must be created each time a new test certificate is issued. To assure a unique allocation of an identification number to a particular certificate, identification numbers cannot be issued multiple times. To create suitable identification numbers, a certificate can be allocated a country code, a regional code and a code for the responsible certifying organization in a first step, for example. The country, regional, and certifying organization codes together comprise the first five characters of the identification number. These five characters are combined with a five-digit serial number, which may be modified through bit rotations. The resulting character sequence can then be rearranged to obtain the final, ten-digit identification number. The advantage of the described procedure is that experienced users can use the identification number to identify in which country and by whom the certificate was issued. At first glance, however, this information cannot be inferred from the identification number, which protects against fraud.

Examples will now be presented for illustrative purposes. It will be understood that certain details in the examples (such as the particular web page displays and menu options) are presented in order to make the examples concrete, but can be implemented in a number of different ways. In these examples, it will be assumed that the certifying organization is TÜV Rheinland and that www.tuv.com appears in the web-address field 16 of the certification symbol 10 that is associated with the product, service, and so forth that is of interest to the user of the invention.

EXAMPLE 1

In this example, the user is an end consumer. The user calls up the TÜV Rheinland homepage by entering the web address www.tuv.com in the address block of his web browser, and then activating the browser. An input box is provided on the homepage so that the user can enter the identification number for a TÜV certificate into the input box. The following navigation options may also be available on the homepage:

TUVdotCOM
Other Certificates
Our Services

As soon as the user has confirmed the entry of the identification number, he may be presented with the following menu:

TUVdotCOM
All Certificates for This Product
Link to Product Image
Download Certificate
Link to All Certificates of This Company
Link to the Company
Other Certificates
Our Services

EXAMPLE 2

In this example, the user is again an end consumer. After entering the web address www.tuv.com in the address block of his browser, the user receives a web page that identifies TÜV and that may present several options. One of these options may be a link identified by a stylized depiction of the certification symbol 10, with a dummy identification number (such as "0000000001")in the ID field 18. When the user activates the link by clicking on it with a pointing device, such as a mouse, a new web page appears. This new web page may include, among other things, a box for entry of the identification number in the ID field 18 of the certification symbol that is associated with the product, service, and so forth that is of interest to the user. The user may then click on a button displayed by the box in order to gain access to the certification information he seeks.

By entering the identification number presented in the ID field 18, a user who is an end consumer can view all of the certificates issued for this product, as well as all of the manufacturer's certificates. To do this, it is not necessary for the end consumer to be authenticated with regard to the system (such as by entering a user ID and/or a password). It is presently envisioned that users of the "end consumer" user group need not be registered. Consequently, this user group gains fast and easy access to the system.

"Manufacturer" and "retailer" groups may be defined in addition to the "end consumer" user group. Users of these two user groups must be authenticated with regard to the system, namely by entering a user ID and a password, when beginning a query. A new user of the "manufacturer" or "retailer" user group may receive his user ID and his password over the course of a registration process when logging in for the first time.

EXAMPLE 3

In this example, the user is a member of the "manufacturer" group. After receiving the TÜV homepage with the aid of his web browser and the web address www.tuv.com, and after being authenticated, the user may be presented with the following expanded menu:

TUVdotCOM
Add/Modify URL
Add/Modify Product Image
Add/Modify Product Information
Add/Modify Technical Specifications
Add/Modify Additional Information
Other Certificates
Our Services Users of the "manufacturer" user group are therefore granted the right to write access to the web database for changing and supplementing information about their products (or services, et cetera). Hence, it is possible for users of this group to use a menu such as the one presented above in order to continuously update the information about the technical characteristics and advantages of their products.

The right to write access by users in the "manufacturer" group does not include the right to modify the certifying organization's test results and certification information. The manufacturer is not allowed to overwrite the performance features ascertained for a certain product within the framework of certification. The manufacturer is only authorized to incorporate additional information about its products into the database, and keep this product information up to date.

The combination of certification information and product-related additional information produces an efficient product database. The registered users of the "manufacturer" and "retailer" groups should be offered user-friendly search tools for utilizing the potential of this database. The search tools permit the formulation of search requests relating to product groups, product types, manufacturers, etc. In addition, it is possible to perform full-text searches in the entire data stock.

The users of the "manufacturer" and "retailer" groups can also make use of all of the functionalities that are unavailable to the non-registered users of the "end consumer" group.

Registered users may also be offered the option of participating in user-related content management. In this instance, the user indicates the product and certificate information that interests him. A personalized data model can then be stored along with the user ID of the registered user. With each log-in, the information relevant for this user can be individually queried and assembled according to the data model.

A product database that is gradually created in this described manner can also be used by official organizations (TGA, ZLG, OSHA, ZVI, etc.). These organizations gain fast, easy access to information relevant to the prosecution of fraud, product piracy, and unauthorized use of certification symbols.

Figure 3:
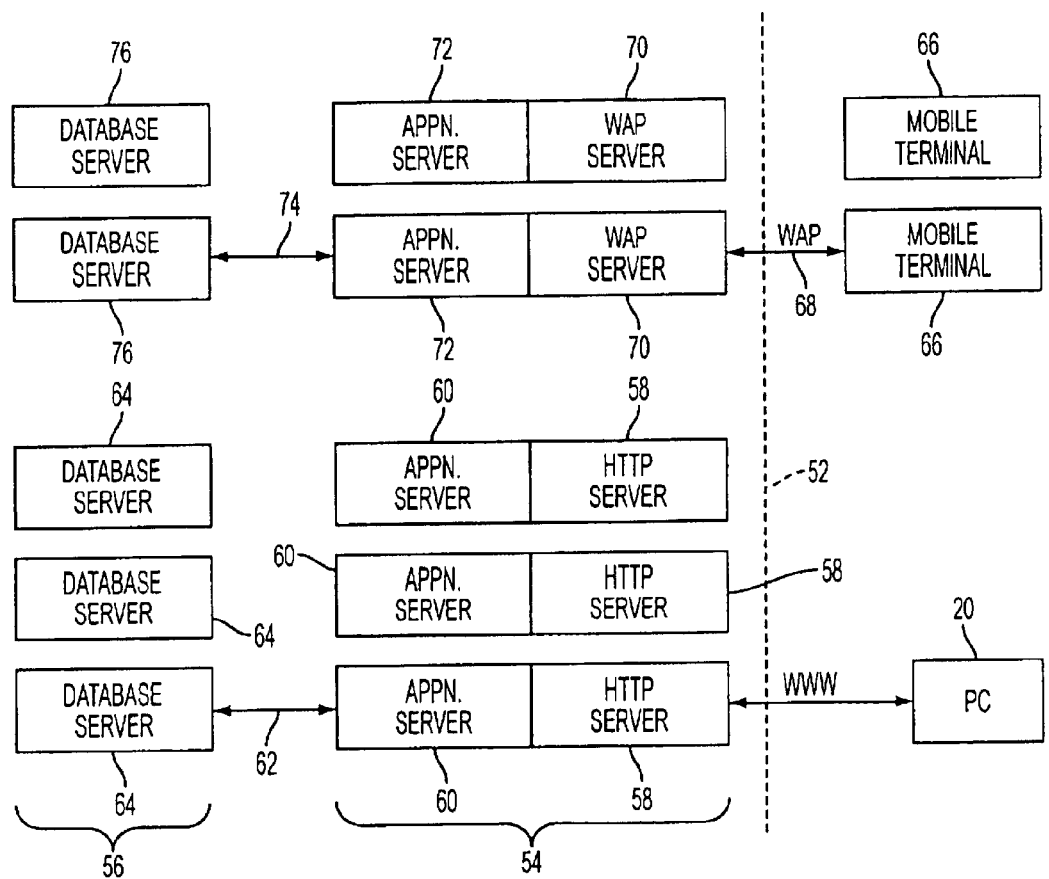
FIG. 3 is a block diagram that presents an overview of the different options for accessing the certification databases.

FIG. 3 illustrates various options for accessing web databases set up by the certifying organization. A first option is to access the web database via the Internet. In this case, the user needs a PC equipped with an Internet browser and a modem. He can thus dial into the World Wide Web (WWW) with an arbitrary Internet service provider. By entering the URL (Uniform Resource Locator) of the certifying organization, he can establish an Internet connection between his PC 20 and the certifying organization's web servers, and enter the homepage of the certifying organization. A firewall 52 protects the server arrangement against viruses, Trojan horses, and other undesired attacks.

To respond to requests, the certifying organization has a cluster 54 of web servers and a cluster 56 of web database servers. The cluster 54 includes a plurality of HTTP servers 58 and application servers 60. Each HTTP server 58 handles a portion of the Internet interface with the users. HTTP stands for HyperText Transfer Protocol, and refers to the commonly-used Internet transfer protocol based on the TCP/IP standard. The web pages of the certifying organization may be stored in the HTTP servers 58 in one of the following formats: HTML (HyperText Markup Language), DHTML (Dynamic HyperText Markup Language), or XML (Extensible Markup Language).

One of the HTTP servers 58 transmits a user search request to an associated web application server 60. This server handles the communication 62 with one of the web databases, which are stored in web database servers 64. The web application server 60 converts the user's search request received from the HTTP server 58 into a suitable database query, and transmits it to one of the web database servers 64.

As soon as the web database server 64 has a search result, the result is transmitted to the web application server 68, and from there to the HTTP server 58. In this respect, the web application servers 60 act as a connector between the web gateway and the web databases.

The certifying organization's server arrangement can preferably be accessed by means of WAP (Wireless Access Protocol) or over radio. This allows a user to access the certification databases of the certifying organization using a mobile terminal 66, such as a WAP-capable hand-held computer or a WAP-capable, Personal Digital Assistant (PDA). As shown in FIG. 3, a database query in accordance with WAP is performed completely analogously to a corresponding Internet access. Using his mobile terminal 66, the user establishes a WAP connection 68 to a WAP server 70 of the certifying organization via a radio interface. The WAP server 70 contains the different input pages required for communicating with the user. User search requests are transmitted to an application server 72, which converts the respective search request into a database query, and handles the communication 74 with a database server 76. The database server 76 transmits the search results to the application server 72, which transmits them to the WAP server 70. The WAP server 70 generates WAP pages for displaying the search results, and transmits them via the WAP connection 68 to the user's mobile terminal 66. The servers are also protected by the firewall 54 for the case of a WAP connection 68.

Figure 4:
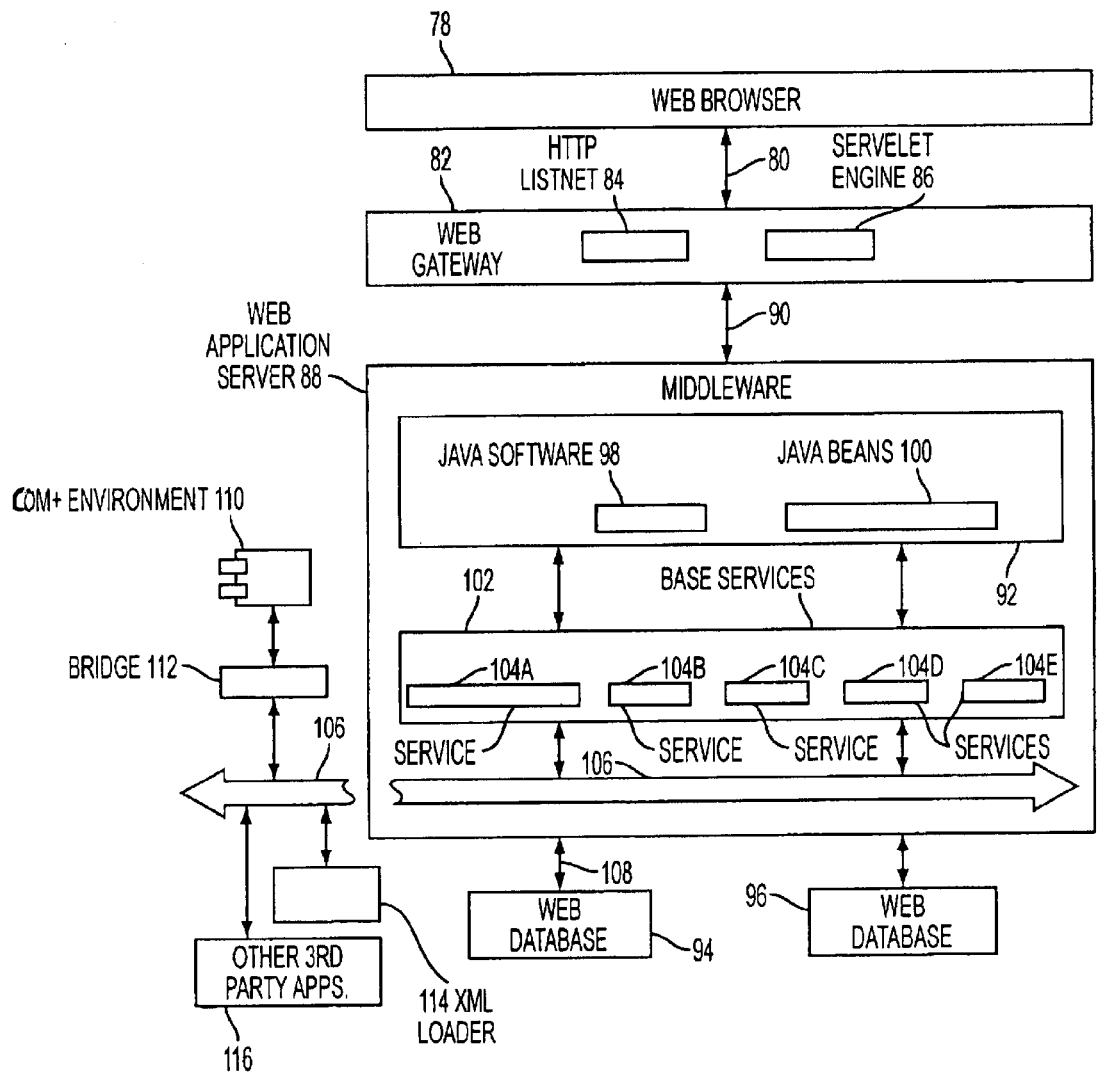
FIG. 4 is a block diagram of the system architecture used to realize the invention.

FIG. 4 schematically illustrates the cooperation between the different servers of the certifying organization's server arrangement and the software modules installed on these servers. A web browser 78 running on the user's PC 20 (FIG. 2A) is connected via an Internet connection 80 to a web gateway 82 that is provided by the certifying organization's HTTP servers 58 (FIG. 3). The web gateway 82 encompasses all of the software components required for the display and function of the certifying organization's web pages. These web pages, that is, the homepage and the pages that can be reached from the homepage, may be written in one of the descriptive languages of HTML, DHTML, or XML. Upon a corresponding user request, these pages are transmitted to the user via the Internet connection 80 and displayed on the monitor 26 of his PC 20. A so-called HTTP ListNet 84 receives and processes the user's inputs and menu selections. To permit interaction with the user, the pages preferably contain Java code. The standard JSP (Java Server Pages) can be used to incorporate the Java code into the web pages. The web gateway 82 includes a co-called servlet engine 86 for processing and transmitting user inputs (particularly the identification number).

The web gateway 82 transmits the user inputs necessary for the database query to a web application server 88 (such as one of the servers 60 in the arrangement shown in FIG. 3) via a TCP/IP connection 90. Middleware 92, which acts as a connector between the web gateway 82 and web databases 94 and 96, runs on this server. Software J2EE (Java 2 Enterprise Edition) 98 may be used in the web server implementation described here. Java beans (EJB, Enterprise Java Beans) may be used to establish the data connection to the web databases 94 and 96, and to perform the actual database query. In such a case, a supply of useful Java beans is stored in a bean container 100. From there, Java beans can be retrieved as needed. Only a few Java beans are required for the database application described here.

One of the Java beans serves in establishing a data connection between the middleware 92 and one of the web databases 94 or 96 (which may be stored in the database servers 64, shown in FIG. 3).

Another Java bean stored in the bean container 100 is responsible for transmitting the search request to the respective web database, and for transferring the search results from the web databases to the middleware 92. The query language SQL (Structured Query Language) is typically used to make search requests.

A further Java bean stored in the bean container 100 serves in performing so-called "session tracking." This Java bean counts the number of times that a specific user accesses the web databases 94 and 96 over the course of a session. If the number of accesses exceeds a specified limit, the responses to the requests of this user can be slowed. An appropriate warning can also be issued to the user. In the event that further query attempts are made, the relevant access session can be ended after a predetermined time span (Time Out Feature). These measures can be implemented to prevent third parties from obtaining a copy of the certification database through continuously repeated search requests, and thereby to prevent the entire database from being read out.

Numerous base services 102, which are required for the data exchange between the web application server 88 and the database servers, are implemented on the web application server 88.

The service "Naming and Directory" 104A administers user profiles for the different registered users. For each user, a personalized data model can be used to determine which data are to be queried and displayed for the user on a default basis. In the event of a lost or disrupted data connection, the service "Persistence" 104B permits the continuation of a data transfer exactly from the point at which the disruption, crash, etc. occurred. The service "Security" 104C monitors the identification characters of the different servers involved in the data exchange, and breaks off the data exchange in the event of unauthorized access. All of the transactions performed between the different servers are detected by the service "Transaction" 104D. The current utilization rate of the individual machines can be determined on the basis of these data. The various user requests are intended to be distributed onto the different servers of a cluster so as to assure the most uniform possible utilization of the machines. This task is performed by the service "Workload" 104E.

CORBA (Common Object Request Broker Architecture) may be used as the backbone for the data exchange between the middleware 92 and the relational web databases 94 and 96. A CORBA backbone 106 allows an exchange of data, and particularly objects, between the connected systems, with platform overlap.

For performing a database query for a specific identification number, the Java bean provided for this purpose must be downloaded. This bean transmits a corresponding SQL request to the web database 94 via the CORBA backbone 106 and a JDBC interface 108. JDBC stands for Java DataBase Connectivity, the conventional standard for connecting a database server to a Java environment. The certification information associated with the identification number is then transmitted in the reverse direction, that is, via the JDBC interface 108 and the CORBA backbone 106 to the middleware 92, and, from there, to the web gateway 82. In the web gateway 82, the certification information is entered into suitable web pages. These web pages are then transmitted to the web browser 78 of the user via the Internet connection 80.

In addition to the certification information, other product and manufacturer information from other sources can be transmitted to the middleware 92, and from there to the web browser 78 of the user, via the CORBA backbone 106. It is especially advantageous that CORBA is a platform-overlap system.

FIG. 4 shows how a COM+ environment 110 that is realized in standard Microsoft COM+ can be connected to the CORBA backbone 106 via a COM/CORBA bridge 112. An XML loader 114, for example, can also be coupled to the CORBA backbone 106. An XML loader of this type permits the incorporation of documents written in the page-description language XML (Extensible Markup Language). These documents can be incorporated into the certifying organization's web-server structure via the CORBA backbone 106, and completely or partially integrated into the certifying organization's web pages. This permits the incorporation of additional information about products, product groups, manufacturers, and so forth, which is available at another web location, into the private data stock.

Other third-party applications 116 can also be connected to the web application server 88 via the CORBA backbone 106.

Figure 5:
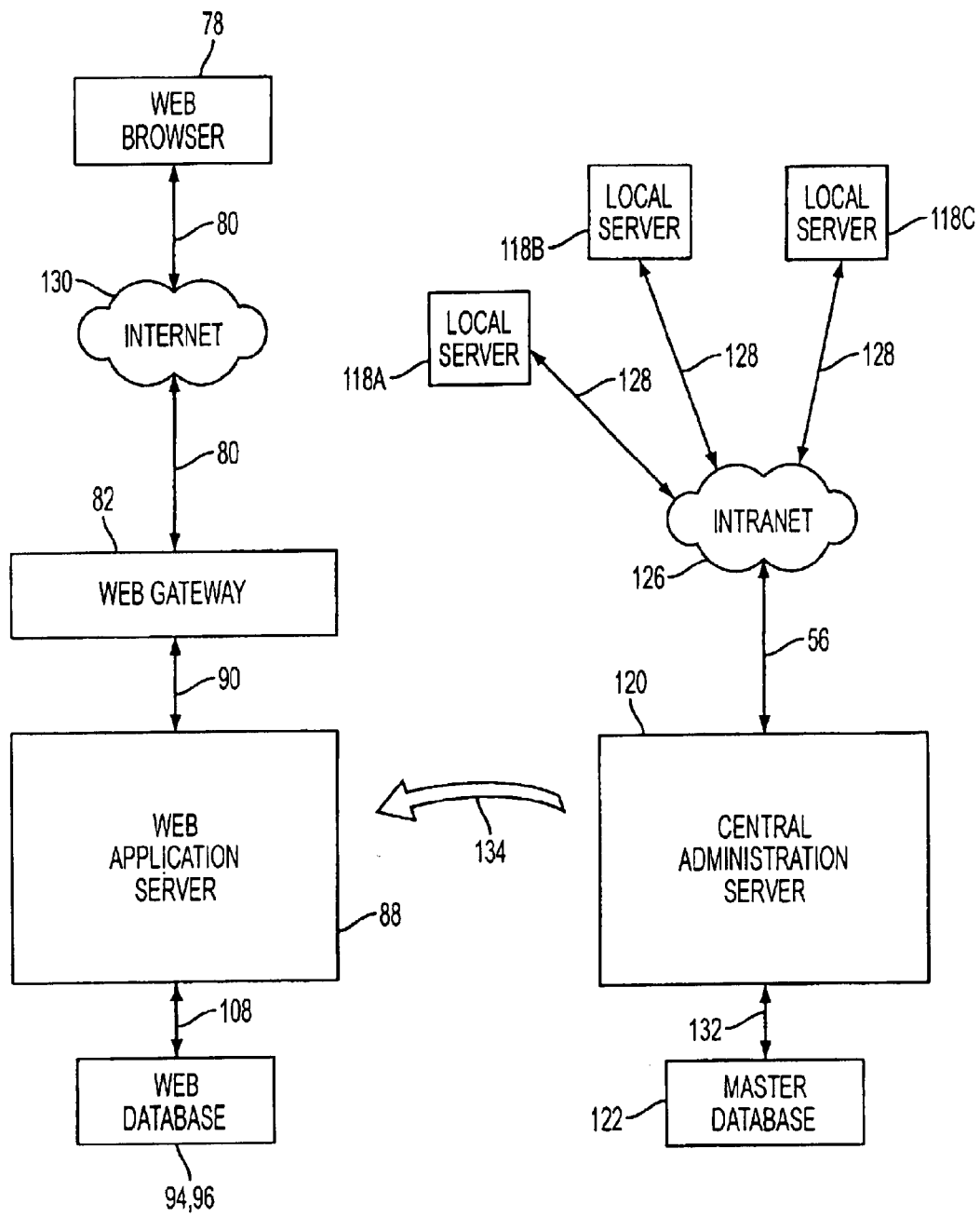
FIG. 5 is a diagram schematically illustrating the data exchange between the publicly accessible portion of the entire system, and the central administration server, which is decoupled from the Internet.

FIGS. 3 and 4 describe the portion of the overall system that is accessible to the public via the Internet, namely the so-called Public Interface. FIG. 5 shows how the data exchange is effected between the publicly-accessible portion of the system and the servers of the internal Intranet of the certifying organization. The certifying organization must decide which internally-available certification data should be made accessible to the public. This process is referred to as Content Administration.

Certification data are preferably collected at more than a dozen different locations all over the world, and administered in a database on local servers 118A, 118B, and 118C. To combine the worldwide data stock in a central administration server 120, each of the local servers 118A-118C creates files that contain all of the changes made to the data stock as of a certain time. Each of the local servers 118A-118C transmits these files, with the updates of the data stock, to the central administration server 120 at regular intervals. With these files, the data stock in a master database 122 connected to the central administration server 120 can be continuously updated. The master database 122 may be connected to the central administration server 120 according to the standard JDBC (Java DataBase Connectivity).

Because only the changes in the respective data stock must be transmitted between the local servers 118A-118C and the central administration server 120, the volume of the data exchange is kept within manageable limits. The data exchange is effected via a private Intranet 126 of the certifying organization. This Intranet may be implemented as a so-called Virtual Private Network in order to prevent external access to the internal stock of certification and product data that is not intended for the public. For this purpose, each data connection 128 associated with the Intranet 126 may be realized in accordance with a tunneling technology, in which each external access would immediately be registered and the data transmission would be halted. In addition, it is possible to cryptographically encode the data to be transferred.

The publicly-accessible portion of the overall system that was described in conjunction with FIGS. 3 and 4 shown on the left side in FIG. 5. A user can use his web browser 78 to establish an HTTP connection 80 (via the Internet 130) to the certifying organization's web gateway 82 in order to access the web database 94, 96 specified for the public. The user query travels over the TCP/IP connection 90 to the web application server 88, which communicates with the web database 94, 96 via the JDBC interface 108 and reads out the requested data.

Whereas all of the certification information is stored in the master database 122, the web database 94, 96 only contains the portion of the certification information that is intended for the public. For example, the exact addresses of the production sites of each manufacturer are stored in the master database. This information is only intended for internal use, and is not transferred into the web database 94, 96.

Each time the data stock in the master database 122 is changed, it should be determined whether a new data record is needed in the web database 94, 96 or an existing data record must be changed. The system preferably determines automatically whether a change in the master database 122 affects the data in the web database 94, 96. If a data record in the web database 94, 96 must be changed or added, the certifying organization responsible for the certificate is preferably notified by e-mail. The notification establishes a deadline for the certifying organization to update the data record. If the deadline passes without any results, the next person or entity in a notification chain should be informed that the web database must be updated.

In the interim, a user who wishes to access the relevant certification information via the Internet should be informed that the corresponding data records are marked as "being processed."

The data records in the master database 122 that are to be transferred into the web database 94, 96 can be transferred from the master database 122 to the web application server 88 via a JDBC interface 132, the administration server 120, and a JDBC interface 134, and from the web application server 88 to the web database 94, 96 via the JDBC interface 108. To ensure the confidentiality of the data contained in the master database 122, the administration server 120 and the master database 122 must always be decoupled from the Internet. Access to the administration server 120 and the master database 122 via the Internet must also be prevented during the data transfer 134. Therefore, the web application server 88 should be decoupled from the Internet 130 during the data transfer 134.

If the web application server is realized as a cluster of servers, it suffices to decouple those web servers and database servers by way of which the data transfer 134 is effected from the Internet. The other web servers can remain connected to the Internet 130 during the data transfer 134, and respond to user requests.

The invention now being fully described, it will be apparent to one of ordinary skill in the art that many changes and modifications can be made thereto without departing from the spirit or scope of the invention as set forth herein.

What is claimed is:

1. A method for permitting a person to request certification information with the aid of a certification symbol that has been allocated to a resource by a certifying organization, the certification symbol having a check region, said method comprising the steps of:
   (a) using a web browser of an Internet access device, together with a web address specified in an address field of the check region of the certification symbol, to access a web-server arrangement of the certifying organization over the Internet, and to enter a specific identification number that appears in an ID field of the check region into an input box on a web page received from the web-server arrangement, the Internet access device being operated by the person requesting certification information;
   (b) transmitting the identification number to the web-server arrangement over the Internet;
   (c) formulating a database search request based on the identification number and transmitting the database search request to a database that is coupled to the web-server arrangement, the database search request being formulated by the web-server arrangement;
   (d) reading certification information associated with the identification number out of the database; and
   (e) transmitting the certification information over the Internet from the web-server arrangement to the Internet access device.

2. The method of claim 1, wherein the transmission of the identification number in step (b) and the transmission of the certification information in step (e) are effected using Hypertext Transfer Protocol.

3. The method of claim 1, wherein the web-server arrangement includes HTTP servers and web application servers.

4. The method of claim 1, wherein the web page in step (a) is created in accordance with at least one standard selected from the group consisting of HTML, DHTML, XML, and JSP.

5. The method of claim 1, wherein steps (c) and (d) comprise using Java beans in the transmission of the database search request and the reading out of the certification information.

6. The method of claim 1, wherein the certification symbol is depicted on a product or packaging for the product.

7. The method of claim 1, wherein the certification symbol is depicted in literature selected from the group consisting of a catalog, a document, operating instructions, and an advertisement.

8. The method of claim 1, wherein the certification symbol is disposed adjacent an auxiliary information block that indicates PQS (Product Safety Quality) certification.

9. The method of claim 1, wherein the certification symbol is disposed adjacent an auxiliary information block that indicates TQM (Total Quality Management) certification.

10. The method of claim 1, wherein step (e) further comprises using a digital watermark to assure the authenticity of the certification information transmitted to the Internet access device.

11. The method of claim 1, wherein the person requesting certification is a member of an "end consumers" user group for which registration is not required.

12. The method of claim 1, wherein the person requesting certification information is a member of a defined user group for which registration is required, and further comprising authenticating the person requesting certification information, and granting at least one of expanded access rights and improved search functionality to the person requesting certification information after the person has been authenticated.

13. The method of claim 12, wherein the defined user group is a "retailers" user group that is provided with product-related search functions.

14. The method of claim 12, wherein the defined user group is a "manufacturers" user group that is granted the right to overwrite certain product information in the database.

15. The method of claim 12, wherein the certification information that is read out of the database, and further information, are displayed to the person requesting certification information in accordance with a personalized data model of the person requesting certification information after the person requesting certification information has been authenticated.

16. The method of claim 12, wherein the database is a web database that receives certification information that is intended for members of a user group for which registration is not required from a master database that stores comprehensive certification information, some of which is not intended for members of the user group for which registration is not required.

17. The method of claim 16, wherein the master database is coupled to an administration server that is not accessible via the Internet.

18. The method of claim 17, further comprising decoupling the web application server from the Internet during a data transfer from the master database to the web database.

19. The method of claim 17, wherein the administration server is coupled in an intranet, and further comprising modifying certification information stored in the master database or adding new certification information to the master database via the intranet.

20. The method of claim 16, further comprising notifying an authorized certifying agent in the event that the certification information stored in the master database is more current than the certification information stored in the web database.

21. The method of claim 20, wherein the notification of the authorized certifying agent establishes a time limit for updating the certification information in the web database.

22. The method of claim 1, further comprising assigning a session ID each time the person requesting certification information accesses the web-server arrangement of the certifying organization, and stopping or slowing responses to queries by the person requesting certification information if a predetermined access frequency or duration is exceeded.

23. The method of claim 1, wherein the transmissions in steps (b) and (d) comprise radio communication using Wireless Access Protocol.

24. The method of claim 1, wherein the resource is one of a product, a system, a service, and a process.

25. A system for fulfilling a request by a person for certification information about a certification symbol that has been allocated to a resource by a certifying organization, the certification symbol having a check region and the request being communicated over the Internet, said system comprising:

a web-server arrangement that stores a predetermined web page with an input region for the person to input an identification number that appears in an ID field of the check region of the certification symbol, the predetermined web page having a web address that is specified in an address field of the check region or being one of a plurality of linked-together web pages stored by the web-server arrangement, with one of the linked-together web pages having the web address that is specified in the address field of the check region; and a web database server having a database in which certification information relating to a plurality of different identification numbers is stored, the web database server receiving a database search request that has been formulated by the web-server arrangement on the basis of the identification number input by the person, and returning certification information corresponding to the input identification number to the web-server arrangement for transfer over the Internet to the person.

26. The system of claim 25, wherein the web-server arrangement comprises at least one HTTP server and at least one web application server.

27. The system of claim 25, wherein the web-server arrangement comprises a plurality of servers disposed in clusters.

28. The system of claim 25, the identification number that appears in the check region and that is input by the person is transmitted to the web-server arrangement using the HTTP protocol, and the certification information corresponding to the input identification number is transmitted to the person using the HTTP protocol.

29. The system of claim 25, wherein the predetermined web page is created in accordance with at least one standard selected from the group consisting of HTML, DHTML, XML, and JSP.

30. The system of claim 25, wherein Java beans are employed to transmit the database search request from the web-server arrangement to the web database server and to read out the certification information corresponding to the input identification number from the web database server.

31. The system of claim 25, further comprising means for updating the database stored in the web database server, the means for updating including an administration server that can be coupled to the web-server arrangement, and a master database storing certification information that is more comprehensive than the certification information stored by the web database server and that includes data not accessible to the general public, the master database being coupled to the administration server.

32. The system of claim 31, wherein the administration server is not accessable via the Internet.

33. The system of claim 33, wherein the web-server arrangement comprises a web application server that is decoupled from the Internet when the database stored in the web database server is being updated.

34. The system of claim 33, wherein the administration sever is coupled in an intrantet, with the certification information stored in the master database being modified or supplemented via the intranet.

35. The system of claim 25, wherein the resource is one of a product, a system, a service, and a process.

* * * * *